United States Patent [19]

Berry et al.

[11] Patent Number: 5,080,388
[45] Date of Patent: Jan. 14, 1992

[54] WHEEL ALIGNMENT ADJUSTMENT DEVICE

[75] Inventors: Jimmy D. Berry, Longmont; Roger S. Tharp, Lakewood, both of Colo.

[73] Assignee: Specialty Products, Inc., Longmont, Colo.

[21] Appl. No.: 525,756

[22] Filed: May 18, 1990

[51] Int. Cl.$^5$ .............................................. B62D 17/00
[52] U.S. Cl. .................................. 280/661; 280/725; 403/4
[58] Field of Search ...................... 280/661, 660, 96.1, 280/690, 691, 724, 725; 403/4, 3

[56] References Cited

U.S. PATENT DOCUMENTS

| Re. 33,179 | 3/1990 | Pettibone | 280/661 |
|---|---|---|---|
| 1,943,721 | 1/1934 | Carpenter et al. | 280/690 X |
| 2,198,544 | 4/1940 | Leighton | 280/661 X |
| 2,990,901 | 7/1961 | Chayne | 280/690 X |
| 3,163,441 | 12/1964 | Traugott | 280/661 |
| 3,526,413 | 9/1970 | Muller | 280/661 |
| 3,880,444 | 4/1975 | Bridges | 280/661 |
| 3,917,308 | 11/1975 | Schulz | 280/691 |
| 4,194,760 | 3/1980 | Shiomi et al. | 280/661 |
| 4,313,617 | 2/1982 | Muramatsu et al. | 280/661 |
| 4,418,938 | 12/1983 | Sullivan et al. | 280/661 |
| 4,420,170 | 12/1983 | Wysocki | 280/661 |
| 4,424,984 | 1/1984 | Shiratori et al. | 280/661 |
| 4,462,241 | 7/1984 | Whisenant | 280/661 X |
| 4,462,609 | 7/1984 | von der Ohe | 280/690 |
| 4,493,493 | 1/1985 | Satchell et al. | 280/661 |
| 4,537,420 | 8/1985 | Ito et al. | 280/661 |
| 4,580,807 | 4/1986 | Cox et al. | 280/661 |
| 4,614,359 | 9/1986 | Lundin et al. | 280/661 X |
| 4,616,845 | 10/1986 | Pettibone | 280/661 |
| 4,618,162 | 10/1986 | Specktor et al. | 280/661 |
| 4,619,465 | 10/1986 | Johnson | 280/661 |
| 4,650,208 | 3/1987 | Mason | 280/661 |
| 4,695,073 | 9/1987 | Pettibone et al. | 280/661 X |
| 4,706,987 | 11/1987 | Pettibone et al. | 280/661 |
| 4,718,691 | 1/1988 | Specktor et al. | 280/661 |
| 4,733,884 | 3/1988 | Pettibone et al. | 280/661 |
| 4,736,964 | 4/1988 | Specktor | 280/661 |
| 4,754,857 | 7/1988 | Urban | 403/4 |
| 4,863,187 | 9/1989 | Artz | 280/661 |
| 4,895,383 | 1/1990 | Abe et al. | 280/661 |
| 4,921,271 | 5/1990 | Berry et al. | 280/661 |

OTHER PUBLICATIONS

Shim-A-Line, Inc., 1986 Wheel Alignment Catalogue (address 3520 Belt Line Blvd., Minneapolis, MN 55716), "Catalogue 31".
Motor Auto Repair Manual, 42nd Ed. (1979) by Motor, 1979 Broadway, 8th fl., New York, NY 10019, pp. 1-232, 1-233—see "1974-79 Corvette Rear Wheel Alignment" and FIG. 3.
Specialty Products Company Catalogue No. 8500 (Feb. 15, 1985), p. 18—see product No. 85500.
Specialty Products Company 85500 Rear Toe Adjustment Kit Instructions.
Moog Automotive, Inc., St. Louis, Missouri, "Front End Service Manual," issued Mar. 1982.
Specialty Products Company, "Total Wheel Alignment Seminar Instruction Manual," data of publication-1989.

Primary Examiner—Charles A. Marmor
Assistant Examiner—Tamara L. Finlay
Attorney, Agent, or Firm—William P. O'Meara; Bruce G. Klaas

[57] ABSTRACT

A wheel alignment adjustment device comprising a first member adapted for supporting an elongate shaft portion of a vehicle wheel suspension assembly and a plurality of parallel overlapping bores extending through the first member adapted for axially receiving the elongate shaft portion in a selected one of the bores and for maintaining the elongate shaft portion in a radially stationary position therein.

11 Claims, 2 Drawing Sheets

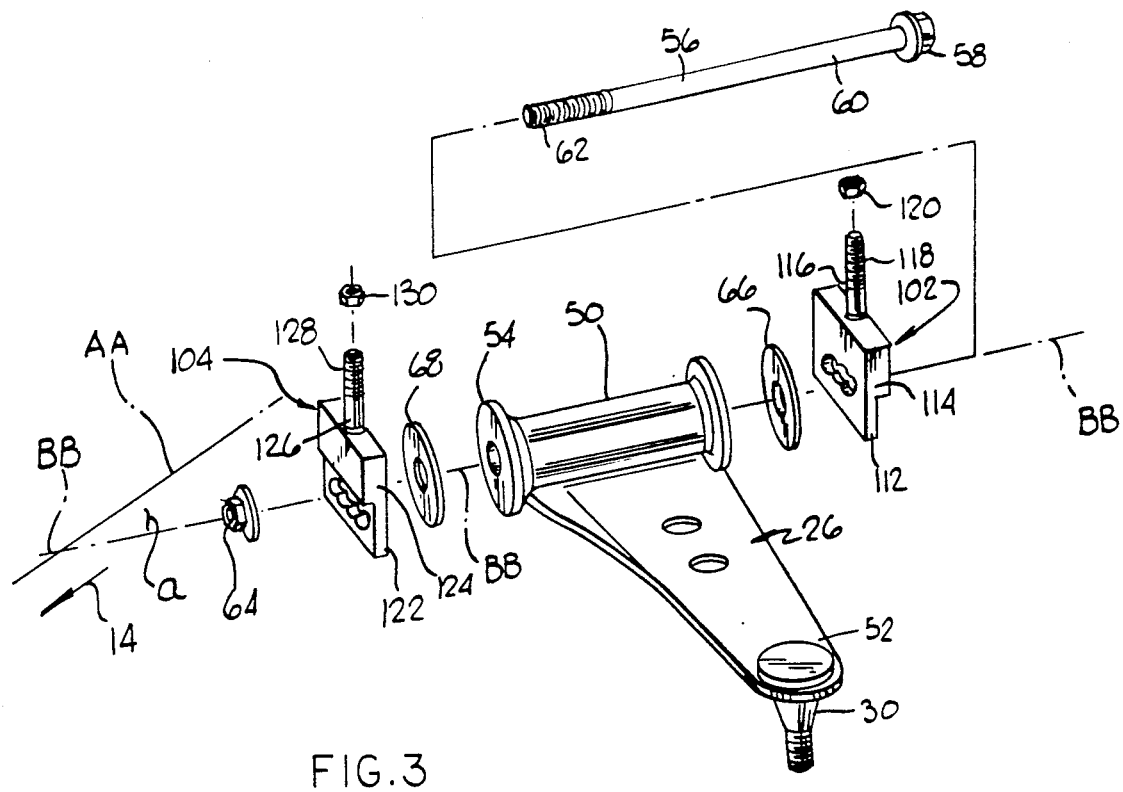
FIG.3
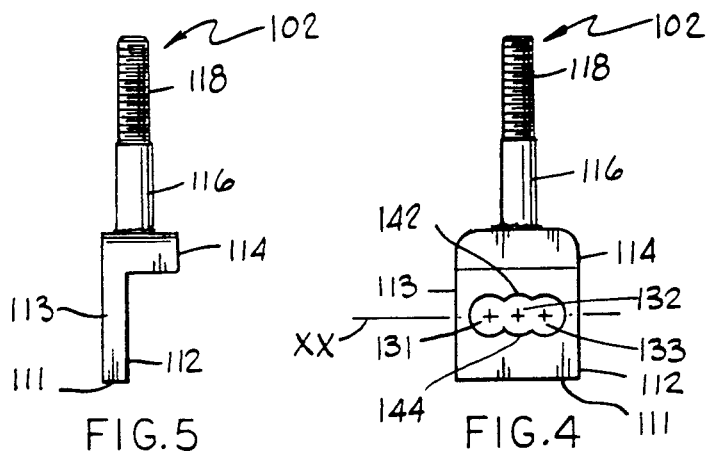
FIG.5    FIG.4
FIG.7    FIG.6

WHEEL ALIGNMENT ADJUSTMENT DEVICE

BACKGROUND OF THE INVENTION

The present invention relates to wheel alignment adjustment devices for automotive vehicles.

Misalignment of vehicle wheels may be caused by road shocks and the like or by improper wheel alignment, either at the factory or at the time new wheel assemblies or tires are installed. Improper wheel alignment may cause unnecessary tire wear and may also create vehicle handling problems.

Wheel alignment parameters include castor, camber and toe. Castor is the amount of forward or rearward angular displacement between a laterally extending vertical plane and a lateral plane which passes through upper and lower ball joint attachment portions of a steering knuckle. Castor angle effects vehicle steering. Camber refers to the amount of inward or outward tilt of the central plane of a wheel from a vertical plane (when the associated vehicle is resting on a level surface). A proper camber angle centers the vehicle load at the region where the tire contacts the road surface. Toe is the difference in the distance between the leading edges of a pair of oppositely positioned wheels (i.e. the front wheels or the rear wheels) and the distance between the trailing edges of that pair of wheels. Improper toe causes excessive tire wear and may cause a vehicle to wander or shimmy.

Some vehicles include apparatus in the vehicle suspension system which enable adjustment of wheel alignment parameters. However many vehicles are not equipped with such alignment adjustment apparatus or are equipped with apparatus which enable only limited adjustment of alignment parameters. As a result, many after-market kits have been introduced for sale to alignment shops for correction of vehicle alignment problems. Such kits generally include one or more items which are adapted to produce a displacement of one component of a wheel suspension assembly with respect to another component to produce a change in one or more alignment parameters.

U.S. Pat. No. 4,921,271 of Jimmy D. Berry and Robert M. Allman, which is hereby specifically incorporated by reference for all that it contains, discloses a bushing assembly for adjusting at least one wheel alignment parameter.

U.S. Pat. No. 4,616,845 (Re. 33,179) of Craig R. Pettibone and U.S. Pat. Nos. 4,695,073, 4,706,987, and 4,733,884 of Craig R. Pettibone and Jimmy D. Berry, all of which are hereby specifically incorporated by reference for all that is disclosed therein, describe several different cam-type alignment adjustment apparatus. U.S. Pat. No. Re. 33,179 discloses a toe adjustment assembly for adjusting the toe in the rear wheels of a vehicle having an independent rear suspension including: a cam device operatively associated with a lateral control arm, a slot provided in fixed relationship with the vehicle frame, and cam engaging surfaces associated with the slot. When the cam device is rotated, it coacts with the cam engaging surfaces to cause relative lateral shifting of a shaft portion of the cam device. This lateral shifting of the cam device shaft portion causes lateral shifting of the associated control arm and thus toe adjustment of an associated wheel.

In some suspension systems, the suspension components are positioned in such close relationship with other vehicle structure that there is insufficient clearance for use of a rotatable cam-type device for adjusting wheel alignment.

U.S. Pat. No. 4,863,187 of William P. Artz, which is hereby incorporated by reference for all that it contains, discloses a bolt restraining plate having a flange portion adapted to engage a strut flange peripheral edge for preventing lateral movement of the plate. The plate has a main body portion having a plurality of spaced apart holes therein adapted to receive a bolt therethrough for providing a different camber setting associated with each hole.

A problem with multiple separated bore plate devices such as described in the Artz patent is that each such plate provides relatively few different alignment settings and the increment of adjustment between such settings is relatively large.

Another problem with the use of alignment adjustment apparatus such as disclosed in the above discussed Pettibone and Artz patents is that it is necessary for a person installing the adjustment apparatus to modify existing suspension components of the vehicle rather than simply replacing existing suspension components with other apparatus components.

SUMMARY OF THE INVENTION

The present invention is directed to a wheel alignment adjustment method and apparatus adapted to overcome the above described and other problems of the prior art.

The invention is also directed to a method and apparatus for adjusting wheel alignment in a vehicle front wheel suspension systems of the type used in 1989 model year Honda Accord automobiles and other similar suspension systems.

Thus the invention may comprise a wheel alignment adjustment device comprising: first member means for supporting an elongate shaft portion of a vehicle wheel suspension assembly; a plurality of parallel overlapping bore means extending through said first member means for axially receiving said elongate shaft portion in a selected one of said bore means and for maintaining said elongate shaft portion in a radially stationary position therein.

The invention may also comprise a vehicle wheel suspension system with selectively adjustable camber comprising: steering knuckle means for supporting a wheel assembly thereon, said knuckle means having an upper end and a lower end; lower control arm means for controlling the position of said knuckle means connected to said lower end of said knuckle means by a lower ball joint; upper control arm means for controlling the position of said knuckle means connected to said upper end of said knuckle means by an upper ball joint; upper control arm bushing means provided on an inboard end of said upper control arm means for receiving an upper control arm bushing bolt therethrough; an upper control arm bushing bolt having a first end and a second end mounted in said upper control arm bushing; first and second anchor means for supporting said bushing bolt; said first anchor means comprising: first member means for supporting said first end of said upper control arm bushing bolt; a plurality of parallel overlapping bore means extending through said first member means for axially receiving said upper control arm bushing bolt in a selected one of said bore means and for maintaining said bushing bolt in a radially stationary position therein; first anchor bolt means fixedly attached to said first member means for mounting said first anchor means on a body portion of the associated vehicle.

The invention may also comprise a method of adjusting the camber of a wheel supported by a wheel suspension assembly of the type comprising: steering knuckle means for supporting a wheel assembly thereon, said knuckle means having an upper end and a lower end; lower control arm means for controlling the position of said knuckle means connected to said lower end of said knuckle means by a lower ball joint; upper control arm means for controlling the position of said knuckle means connected to said upper end of said knuckle means by an upper ball joint; upper control arm bushing means provided on an inboard end of said upper control arm means for receiving an upper control arm bushing bolt therethrough; an upper control arm bushing bolt having a first end and a second end mounted in said upper control arm bushing; first and second anchor devices attached to body portions of the associated vehicle and each supporting an end portion of said bushing bolt in a shaft receiving portion thereof, comprising the steps of: removing said first and second anchor devices; providing first and second camber adjustable anchor devices each comprising a plate member having a plurality of parallel overlapping bores extending therethrough which are each adapted for axially receiving a shaft portion of a control arm bushing bolt therethrough in radially nondisplaceable relationship therewith; mounting end portions of an upper control arm bushing bolt in selected ones of said plurality of overlapping bores in said first and second camber adjustable anchor devices which are associated with a desired wheel camber position.

The invention may also comprise a method of adjusting the castor of a wheel supported by a wheel suspension assembly of the type comprising: steering knuckle means for supporting a wheel assembly thereon, said knuckle means having an upper end and a lower end; lower control arm means for controlling the position of said knuckle means connected to said lower end of said knuckle means by a lower ball joint; upper control arm means for controlling the position of said knuckle means connected to said upper end of said knuckle means by an upper ball joint; upper control arm bushing means provided on an inboard end of said upper control arm means for receiving an upper control arm bushing bolt therethrough; an upper control arm bushing bolt having a first end and a second end mounted in said upper control arm bushing; first and second anchor devices attached to body portions of the associated vehicle and each supporting an end portion of said bushing bolt in a shaft receiving portion thereof, comprising the steps of: removing said first and second anchor devices; providing first and second castor adjustable anchor devices each comprising a plate member having a plurality of parallel overlapping bores extending therethrough which are each adapted for axially receiving a shaft portion of a control arm bushing bolt therethrough in radially nondisplaceable relationship therewith; mounting end portions of an upper control arm bushing bolt in selected ones of said plurality of overlapping bores in said first and second castor adjustable anchor devices which are associated with a desired wheel camber position.

BRIEF DESCRIPTION OF THE DRAWINGS

An illustrative and presently preferred embodiment of the invention is shown in the accompanying drawings in which:

FIG. 3 is a detailed perspective view of a control arm assembly and associated alignment adjustment devices.

FIG. 4 is a front elevation view of an alignment adjustment device.

FIG. 5 is a side elevation view of the alignment adjustment device.

FIG. 6 is a front elevation view of another alignment adjustment device.

FIG. 7 is a side elevation view of the alignment adjustment device of FIG. 6.

DETAILED DESCRIPTION OF THE INVENTION

Figure 2:
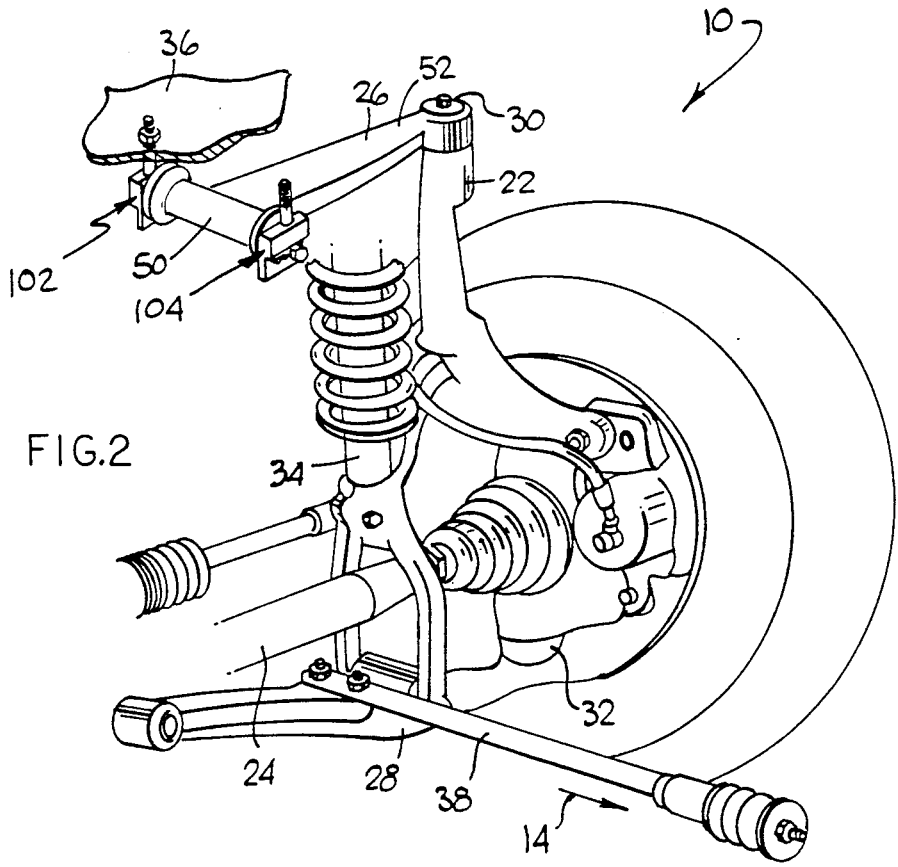
FIG. 2 is a perspective view of a front wheel suspension system with alignment adjustment devices.

FIGS. 2-4 illustrate a wheel alignment adjustment device 102 which comprises a first member 112 for supporting an elongate shaft portion 60 of a vehicle wheel suspension assembly 10 and a plurality of overlapping bores 131, 132, 133 extending through the first member 112 for axially receiving the elongate shaft portion 60 in a selected one of the bores 131, 132, 133 and for maintaining the elongate shaft portion in a radially stationary position therein. Having thus described a wheel alignment adjustment device in general, a prior art suspension system in which such a device is adapted to be used and further specific features of the device will now be described in detail.

Figure 1:
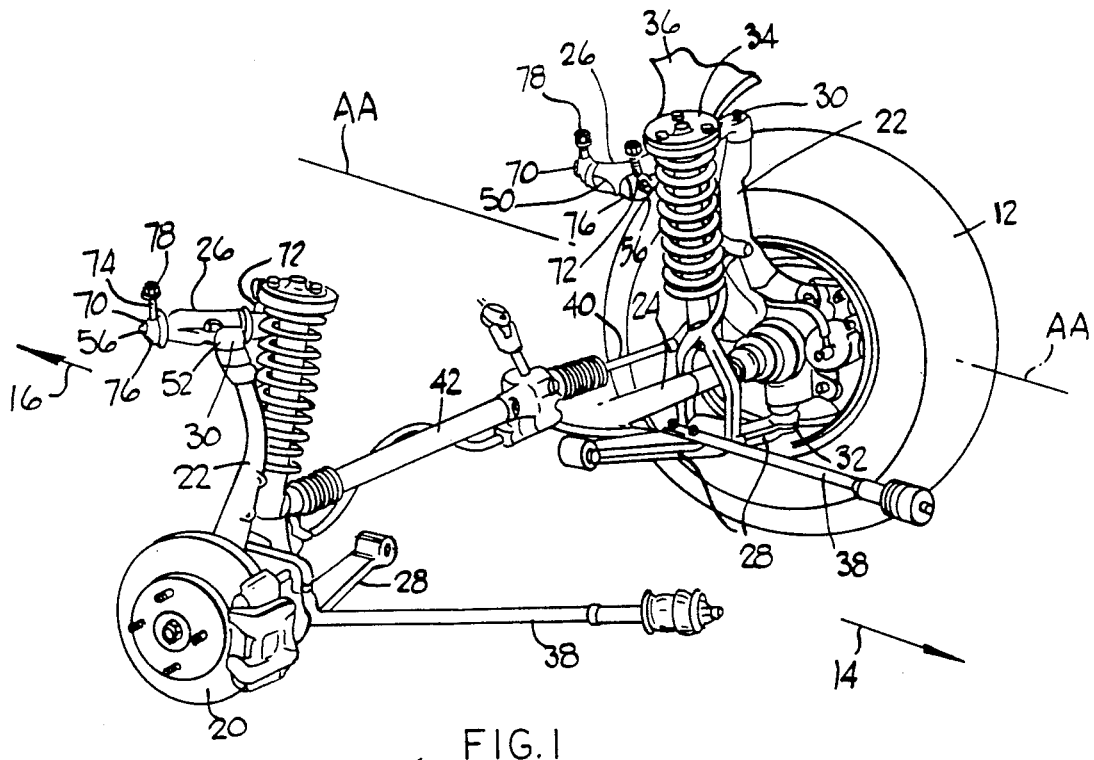
FIG. 1 is a perspective view of a prior art front wheel suspension system.

FIG. 1 illustrates a prior art front wheel suspension system of a type used in 1989 Honda Accord automobiles and a number of other automotive vehicles. The suspension supports the front wheels 12 of an associated automobile having a forwardly 14 and rearwardly 16 extending, central longitudinal axis AA. Each wheel suspension assembly comprises a hub 20 rotatably mounted on a steering knuckle 22. The hub is rotated by a driver assembly 24. An upper control arm 26 and a lower control arm 28 are pivotally attached to upper and lower portions of the steering knuckle 22 by upper and lower ball joints 30, 32. A strut assembly 34 is provided having an upper end connected to a vehicle fender panel 36 and a lower end connected to a mid-portion of lower control arm 28. A strut rod 38 is connected at one end to lower control arm 28 and at the other end to a portion of the vehicle frame (not shown). A tie rod 40 is connected at one end to a mid-portion of the strut assembly 34 and at the other end to a stabilizer bar 42.

The upper control arm 26 comprises an inboard end 50 and an outboard end 52. The outboard end is connected by upper ball joint 30 to the steering knuckle 22. The inboard end 50 has a transversely extending bushing 54, FIG. 3, fixedly mounted therein. The bushing 54 has a central longitudinal bushing axis BB and is adapted to closely slidingly receive a bushing bolt 56 therewithin. The bushing bolt 56 comprises a head portion 58 and a shaft portion 60 having a threaded end portion 62 which is adapted to threadingly accept a nut 64 thereon. The upper control arm 26 is positioned such that the central longitudinal axis BB of the bushing is positioned in somewhat skewed relationship with central longitudinal axis AA of the automobile, e.g. at an angle "a" which is 10° to 15° out of parallel alignment with the central longitudinal axis AA.

A pair of washers 66, 68, FIG. 3, are adapted to be received on the bushing bolt and positioned in abutting contact with end portions of the upper control arm bushing 54. Rear and front anchor members 70, 72, FIG. 1, each having a threaded shaft portion 74 connected to a body portion 76 having a single cylindrical bore extending therethrough, are adapted to receive and support end portions of bushing bolt 56. Anchor nuts 78 are provided for attaching the threaded shaft portion 74 of each anchor member 70, 72 to an associated portion of the vehicle fender panel 36.

Rear and front alignment adjustment devices 102, 104, FIGS. 2-6, are adapted to replace the rear and front anchor members 70, 72 of the suspension assembly of FIG. 1 to enable adjustment of the camber or castor of vehicle left front wheel 12. A pair of right side adjustment devices (not shown), which may comprise mirror images of left side adjustment devices 102, 104, may be provided for adjusting the camber of the vehicle right front wheel.

Left side rear adjustment device 102 comprises a vertically disposed plate 112 having a bottom edge 111 and an inboard edge 113. A horizontally disposed plate 114 is fixedly attached to an upper edge portion of vertically disposed plate 112. A vertically disposed shaft 116 is fixedly attached to and extends upwardly from horizontally disposed plate 114 Shaft 116 has a threaded upper end portion 118 which is adapted to threadingly accept a nut 120. Left side front adjustment device 104 comprises a vertically disposed plate 122 having a bottom edge 121 and an inboard edge 123. A horizontally disposed plate 124 is fixedly attached to the upper edge of vertically disposed plate 122. A vertically disposed shaft 126 extends upwardly and is fixedly connected to horizontally disposed plate 124. Shaft 126 has a threaded end portion 128 adapted to threadingly accept a nut 130 thereon. Each of the devices 102, 104 may be machined from 4130 steel or other suitable high-strength material or alternatively may be forged.

Vertically disposed plate 112 of adjustment device 102 comprises three overlapping cylindrical bores 131, 132, 133 therein. Vertically disposed plate 122 of adjustable camber anchor member 104 comprises four overlapping cylindrical bores 134, 135, 136, 137 extending therethrough. Bores 131-133 are each centered along a horizontal axis XX, and bores 134-137 are each centered along a horizontal axis YY. Bores 131-133 have coplanar axes. Bores 134-137 have coplanar axes. In one typical embodiment of the invention in which the upper control arm bushing bolt 56 which is to be supported by the devices 102, 104 has a diameter of 0.389 in., each of the bores 131-137 in devices 102, 104 has a diameter of 13/32 in. and the bore centers are spaced 0.28 in. apart.

The vertical plate portion 112 of anchor member 102 may comprise a thickness of 0.250 in., a width of 1.22 in. and a height, as measured to the top of horizontally disposed plate member 114, of 1.5 in. The horizontally extending alignment axis XX for bores 131-133 may be positioned 0.5 in. above the bottom edge 111 of vertical plate member 112. Horizontally disposed plate member 114 may comprise a thickness of 0.4 in. and may extend horizontally 0.75 in. as measured from the back surface of vertically disposed plate 112. Vertically disposed shaft 116 may be axially centered 0.425 in. from a front vertical edge portion of the horizontally disposed plate 114 in alignment with the center of plate 112. The length of shaft 116 may be 1.93 in. as measured from the top of horizontally disposed plate 114. (The adjustment device corresponding to device 102 for the right front wheel may be identical to device 102.)

Alignment adjustment device 104 may be identically constructed to device 102 except that vertically disposed plate 122 may have a width of 1.5 in. with the four bores 134-137 laterally centered thereon along horizontal axis YY at a spacing of 0.28 in. between centers, and with the vertically disposed shaft 126 positioned in alignment with bore 135. (In the adjustment device corresponding to device 104 for the right front wheel, the vertically disposed shaft is centered over the third bore from the left edge of the vertically disposed plate rather than the second.) Different configurations for devices 102 and 104 are desirable because of the skewed relationship of the control arm bushing axis BB with respect to the central longitudinal axis AA of the automobile. This difference in device 102, 104 configurations allows camber to be adjusted without at the same time changing the castor (or vice versa) of an associated vehicle wheel.

Camber changes which may be produced in a 1989 Honda Accord front left wheel through use of various combinations of bores in the two adjustable camber anchor members 102, 104 of the above-described construction are as follows: for a −0.75° camber change; use hole nos. 131 and 134, for a camber the same as original equipment, use hole nos. 132 and 135; for a +0.75° camber change, use hole nos. 132 and 136; for a +1.50° camber change, use hole nos. 133 and 137. Of course, other bore spacings and other numbers of bores could be used to provide for different increments of camber change. However, it is important that the amount of overlap between bores does not become so great as to enable radial displacement of the bushing bolt within the selected bore. Thus, in a preferred mode of construction, the radius of each bore is less than 10% greater than the radius of the shaft which is adapted to be received therein, and the pair of upper and lower arcuate surfaces, e.g. 142, 144, of the associated plate member which define each bore each comprise an arc of more than 20°; which arc is preferably between 20° and 120°.

The alignment adjustment devices 102, 104 may also be used to adjust wheel castor through proper selection of bores. For example, by selecting bore 133 on device 102 and bore 135 on device 104, a castor change of 1.25 in. may be produced without changing wheel camber.

In order to install the devices 102, 104 on the suspension assembly associated with a particular wheel 12, the following sequence of steps may be employed: (1) Initially inspect the suspension to determine the camber or castor change which is needed. (2) Raise the vehicle and remove the tire and wheel assembly 12. (3) Loosen the upper control arm bushing bolt 56. (4) From inside the engine compartment, remove the nuts 78 from the upper control arm anchor members 70, 72 (depending upon the vehicle, this may require removal of other parts for accessibility). (5) Remove the upper control arm anchor members 70, 72 from the fender panel 36, leaving the control arm attached to the spindle 22. (6) Remove the upper control arm bushing bolt and, if necessary to accommodate the alignment adjustment devices 102, 104, replace the bushing bolt 56 with a longer bushing bolt of the same diameter. (7) Select the appropriate bore in each of the alignment adjustment devices 102, 104 and install the devices 102, 104 on the bushing bolt adjacent to the control arm bushing in replacement of anchor members 70, 72. (8) Prior to fully tightening the control arm bushing bolt nut 64, mount the threaded shaft portion of each of the alignment devices 102, 104 through holes in associated portions of the fender panel 36 and attach the devices 102, 104 to the panel through use of associated nuts 120, 130. (9) Torque the control arm bushing bolt nut to 40 ft-lb and the adjustment device nuts to 53 ft-lb. (10) Reinstall the tire and wheel assembly.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A vehicle wheel suspension system with selectively adjustable camber comprising:

steering knuckle means for supporting a wheel assembly thereon, said knuckle means having an upper end and a lower end;

lower control arm means for controlling the position of said knuckle means connected to said lower end of said knuckle means by a lower ball joint;

upper control arm means for controlling the position of said knuckle means connected to said upper end of said knuckle means by an upper ball joint;

upper control arm bushing means provided on an inboard end of said upper control arm means for receiving an upper control arm bushing bolt therethrough;

an upper control arm bushing bolt having a first end and a second end mounted in said upper control arm bushing;

first and second anchor means for supporting said bushing bolt;

said first anchor means comprising:

first member means for supporting said first end of said upper control arm bushing bolt;

a plurality of parallel overlapping bore means extending through said first member means for axially receiving said upper control arm bushing bolt in a selected one of said bore means and for maintaining said bushing bolt in a radially stationary position therein;

first anchor bolt means fixedly attached to said first member means for mounting said first anchor means on a body portion of the associated vehicle.

2. The invention of claim 1, said second anchor means comprising:

second member means for supporting said second end of said upper control arm bushing bolt;

a plurality of parallel overlapping bore means extending through said second member means for axially receiving said upper control arm bushing bolt in a selected one of said bore means and for maintaining said bushing bolt in a radially stationary position therein;

second anchor bolt means fixedly attached to said second member means for mounting said second anchor means on a body portion of the associated vehicle.

3. The invention of claim 1; said first member means comprising a flat plate.

4. The invention of claim 3; said bore means having coplanar central axes.

5. The invention of claim 4; said first anchor bolt means having a central longitudinal axis extending perpendicular to a plane defined by said coplanar central axes of said bore means.

6. The invention of claim 3; said bore means defining an elongated opening having a first lateral end surface, a second lateral end surface, an upper end surface and a lower end surface;

said upper end surface and said lower end surface being defined by a plurality of oppositely positioned, arcuate, upper and lower surface pairs of equal radius of curvature; said radius of curvature of each of said plurality of upper and lower surface pairs being less than 10% greater than the radius of a shaft portion of said control arm bushing bolt.

7. The invention of claim 6; each surface of each of said surface pairs comprising an arc of between 20 degrees and 120 degrees.

8. A method of adjusting the camber of a wheel supported by a wheel suspension assembly of the type comprising: steering knuckle means for supporting a wheel assembly thereon, said knuckle means having an upper end and a lower end; lower control arm means for controlling the position of said knuckle means connected to said lower end of said knuckle means by a lower ball joint; upper control arm means for controlling the position of said knuckle means connected to said upper end of said knuckle means by an upper ball joint; upper control arm bushing means provided on an inboard end of said upper control arm means for receiving an upper control arm bushing bolt therethrough; an upper control arm bushing bolt having a first end and a second end mounted in said upper control arm bushing; first and second anchor devices attached to body portions of the associated vehicle and each supporting an end portion of said bushing bolt in a shaft receiving portion thereof, comprising the steps of:

removing said first and second anchor devices;

providing first and second camber adjustable anchor devices each comprising a plate member having a plurality of parallel overlapping bores extending therethrough which are each adapted for axially receiving a shaft portion of a control arm bushing bolt therethrough in radially nondisplaceable relationship therewith;

mounting end portions of an upper control arm bushing bolt in selected ones of said plurality of overlapping bores in said first and second camber adjustable anchor devices which are associated with a desired wheel camber position.

9. The method of claim 8 comprising the step of attaching each of the adjustable camber anchor devices to a vehicle body portion.

10. A method of adjusting the castor of a wheel supported by a wheel suspension assembly of the type comprising: steering knuckle means for supporting a wheel assembly thereon, said knuckle means having an upper end and a lower end; lower control arm means for controlling the position of said knuckle means connected to said lower end of said knuckle means by a lower ball joint; upper control arm means for controlling the position of said knuckle means connected to said upper end of said knuckle means by an upper ball joint; upper control arm bushing means provided on an inboard end of said upper control arm means for receiving an upper control arm bushing bolt therethrough; an upper control arm bushing bolt having a first end and a second end mounted in said upper control arm bushing; first and second anchor devices attached to body portions of the associated vehicle and each supporting an end portion of said bushing bolt in a shaft receiving portion thereof, comprising the steps of:

removing said first and second anchor devices;

providing first and second castor adjustable anchor devices each comprising a plate member having a plurality of parallel overlapping bores extending therethrough which are each adapted for axially receiving a shaft portion of a control arm bushing bolt therethrough in radially nondisplaceable relationship therewith;

mounting end portions of an upper control arm bushing bolt in selected ones of said plurality of overlapping bores in said first and second castor adjustable anchor devices which are associated with a desired wheel camber position.

11. The method of claim 10 comprising the step of attaching each of the adjustable camber anchor devices to a vehicle body portion.

* * * * *